(12) United States Patent
Meyer et al.

(10) Patent No.: US 7,106,491 B2
(45) Date of Patent: Sep. 12, 2006

(54) SPLIT BEAM MICROMIRROR

(75) Inventors: Thomas J. Meyer, Dallas, TX (US); Brett A. Mangrum, Dallas, TX (US); Mark F. Reed, Richardson, TX (US); James D. Huffman, Plano, TX (US); Michael A. Mignardi, Richardson, TX (US); Wei-Yan Shih, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/331,495

(22) Filed: Dec. 30, 2002

(65) Prior Publication Data

US 2003/0123126 A1 Jul. 3, 2003

Related U.S. Application Data (60) Provisional application No. 60/343,636, filed on Dec. 28, 2001.

(51) Int. Cl.
| | |
|---|---|
| *G02B 26/00* | (2006.01) |
| *G02B 26/08* | (2006.01) |
| *G02B 7/182* | (2006.01) |
| *H02K 35/00* | (2006.01) |
| *B41J 2/47* | (2006.01) |

(52) U.S. Cl. .................. 359/291; 359/290; 359/224; 359/646; 310/36; 347/239

(58) Field of Classification Search .............. 359/214, 359/224, 290, 291, 295, 298, 846; 310/36, 310/90, 309; 347/239
See application file for complete search history.

(56) References Cited

U.S. PATENT DOCUMENTS

| | | | |
|---|---|---|---|
| 5,061,049 A | 10/1991 | Hornbeck | |
| 5,583,688 A | 12/1996 | Hornbeck | |
| 5,835,258 A | 11/1998 | Papuchon et al. | 359/291 |
| 6,048,840 A | 4/2000 | Hearn et al. | 359/291 |
| 6,147,790 A * | 11/2000 | Meier et al. | 359/291 |
| 6,290,864 B1 | 9/2001 | Patel et al. | 216/79 |
| 6,337,760 B1 | 1/2002 | Huibers et al. | 359/291 |
| 6,388,661 B1 | 5/2002 | Richards | 345/204 |
| 6,396,619 B1 | 5/2002 | Huibers et al. | 359/291 |
| 6,447,126 B1 * | 9/2002 | Hornbeck | 359/871 |
| 6,523,961 B1 | 2/2003 | Ilkov et al. | 353/99 |
| 6,529,310 B1 | 3/2003 | Huibers et al. | 359/291 |
| 2002/0047172 A1 | 4/2002 | Reid | 257/415 |
| 2002/0105729 A1 | 8/2002 | Richards et al. | 359/634 |
| 2002/0109821 A1 | 8/2002 | Huibers et al. | 353/84 |
| 2002/0132389 A1 | 9/2002 | Patel et al. | 438/97 |
| 2002/0176150 A1 | 11/2002 | Huibers | 359/291 |
| 2002/0185699 A1 | 12/2002 | Raid | 257/414 |
| 2002/0195423 A1 | 12/2002 | Patel et al. | 216/73 |
| 2002/0196524 A1 | 12/2002 | Huibers et al. | 359/291 |
| 2002/0197761 A1 | 12/2002 | Patel et al. | 438/52 |
| 2003/0036215 A1 | 2/2003 | Reid | 438/52 |
| 2003/0047533 A1 | 3/2003 | Reid et al. | 216/24 |
| 2003/0054588 A1 | 3/2003 | Patel et al. | 438/107 |
| 2003/0073302 A1 | 4/2003 | Huibers | 438/622 |
| 2003/0134449 A1 | 7/2003 | Huibers | 438/52 |
| 2003/0137501 A1 | 7/2003 | Richards | 345/204 |

* cited by examiner

*Primary Examiner*—Goergia Epps
*Assistant Examiner*—William Choi
(74) *Attorney, Agent, or Firm*—Charles A. Brill; Wade James Brady, III; Frederick J. Telecky, Jr.

(57) ABSTRACT

A system and method of providing a micromirror pixel 400 that is highly resistant to bright failure states. The micromirror 400 uses an asymmetric yoke 402 to ensure the mirror is only attracted to the address electrode in one rotation direction. The landing mechanism on the other side of the torsion binge axis also is altered to allow the pixel to over rotate in the "off" direction. The over rotation ensures that light reflected by the mirror when in the off direction will miss the projection lens pupil, allowing the corresponding pixel to remain dark in both an operational and failed state.

18 Claims, 6 Drawing Sheets

SPLIT BEAM MICROMIRROR

This application claims priority under 35 USC § 119(e)(1) of provisional application No. 60/343,636 filed Dec. 28, 2001.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |
| 6,147,790 | May 13, 1999 | Nov. 14, 2000 | Spring-Ring Micromechanical Device |

FIELD OF THE INVENTION

This invention relates to the field of micromirror devices, more particularly to arrays of micromirror devices.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved dramatically over the past fifteen to twenty years. Early devices used a deformable reflective membrane which, when electrostatically attracted to an underlying address electrode, dimpled toward the address electrode. Schlieren optics were used to illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form a deformable top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device.

Modern micromirror arrays often have on the order of 1.3 million individual mirrors. As with other complex devices, these large arrays are difficult to produce to the level of perfection required. Methods and devices to improve producibility and reliability are constantly needed.

SUMMARY OF THE INVENTION

Objects and advantages will be obvious, and will in part appear hereinafter and will be accomplished by the present invention that provides a method and device for an improved micromechanical device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Objects and advantages will be obvious, and will in part appear hereinafter and will be accomplished by the present invention that provides a method and device for an improved micromirror device. According to one embodiment of the present invention, a micromirror device is provided. The micromirror device comprising: a substrate; at least one address electrode supported by the substrate; a torsion hinge supported apart from the substrate; an asymmetric yoke supported by the torsion hinge; and a deflectable member supported by and apart from the yoke.

According to another embodiment of the present invention, a micromirror device is provided. The micromirror device comprising: a substrate; at least one address electrode supported by the substrate; a torsion hinge supported apart from the substrate; a yoke supported by the torsion hinge; and a deflectable member supported by and apart from the yoke, the yoke limiting deflection of the deflectable member in a first direction of rotation about the torsion hinge and not so limiting the deflection in an opposite direction.

According to another embodiment of the present invention, a micromirror device is provided. The micromirror device comprising: a substrate; a torsion hinge supported apart from the substrate; a yoke supported by the torsion hinge; a deflectable member supported by and apart from the yoke; and an address electrode supported by the substrate on one side of an axis of the torsion hinge, the address electrode operable to attract the yoke only toward the one side of the torsion hinge axis.

According to another embodiment of the present invention, a micromirror device is provided. The micromirror device comprising: a substrate; a torsion hinge supported apart from the substrate; a deflectable member supported by and apart from the torsion hinge; a means for rotating the deflectable member about the torsion hinge; and a means for limiting the deflection of the deflectable member in a first direction to a greater degree than in a second direction.

According to another embodiment of the present invention, a display system is provided. The display system comprising: a light source for providing a beam of light along a light path; a micromirror on the light path for selectively modulating the beam of light, the micromirror comprising: a substrate; at least one address electrode supported by the substrate; a torsion hinge supported apart from the substrate; an asymmetric yoke supported by the torsion hinge; and a deflectable member supported by and apart from the yoke; and a projection lens for focusing the selectively modulated beam of light.

According to another embodiment of the present invention, a display system is provided. The display system comprising: a light source for providing a beam of light along a light path; a micromirror on the light path for selectively modulating the beam of light, the micromirror comprising: a substrate; at least one address electrode supported by the substrate; a torsion hinge supported apart from the substrate; a yoke supported by the torsion hinge; and a deflectable member supported by and apart from the yoke, the yoke limiting deflection of the deflectable member in a first direction of rotation about the torsion hinge and not so limiting the deflection in an opposite direction; and a projection lens for focusing the selectively modulated beam of light.

According to another embodiment of the present invention, a display system is provided. The display system comprising: a light source for providing a beam of light along a light path; a micromirror on the light path for selectively modulating the beam of light, the micromirror comprising: a substrate; a torsion hinge supported apart from the substrate; a yoke supported by the torsion hinge; a deflectable member supported by and apart from the yoke; and an address electrode supported by the substrate on one side of an axis of the torsion hinge, the address electrode operable to attract the yoke only toward the one side of the torsion hinge axis; and a projection lens for focusing the selectively modulated beam of light.

According to another embodiment of the present invention, a display system is provided. The display system comprising: a light source for providing a beam of light along a light path; a micromirror on the light path for selectively modulating the beam of light, the micromirror comprising: a substrate; a torsion hinge supported apart from the substrate; a deflectable member supported by and apart from the torsion hinge; a means for rotating the deflectable member about the torsion hinge; and a means for limiting the deflection of the deflectable member in a first direction to a greater degree than in a second direction; and a projection lens for focusing the selectively modulated beam of light.

Figure 1:
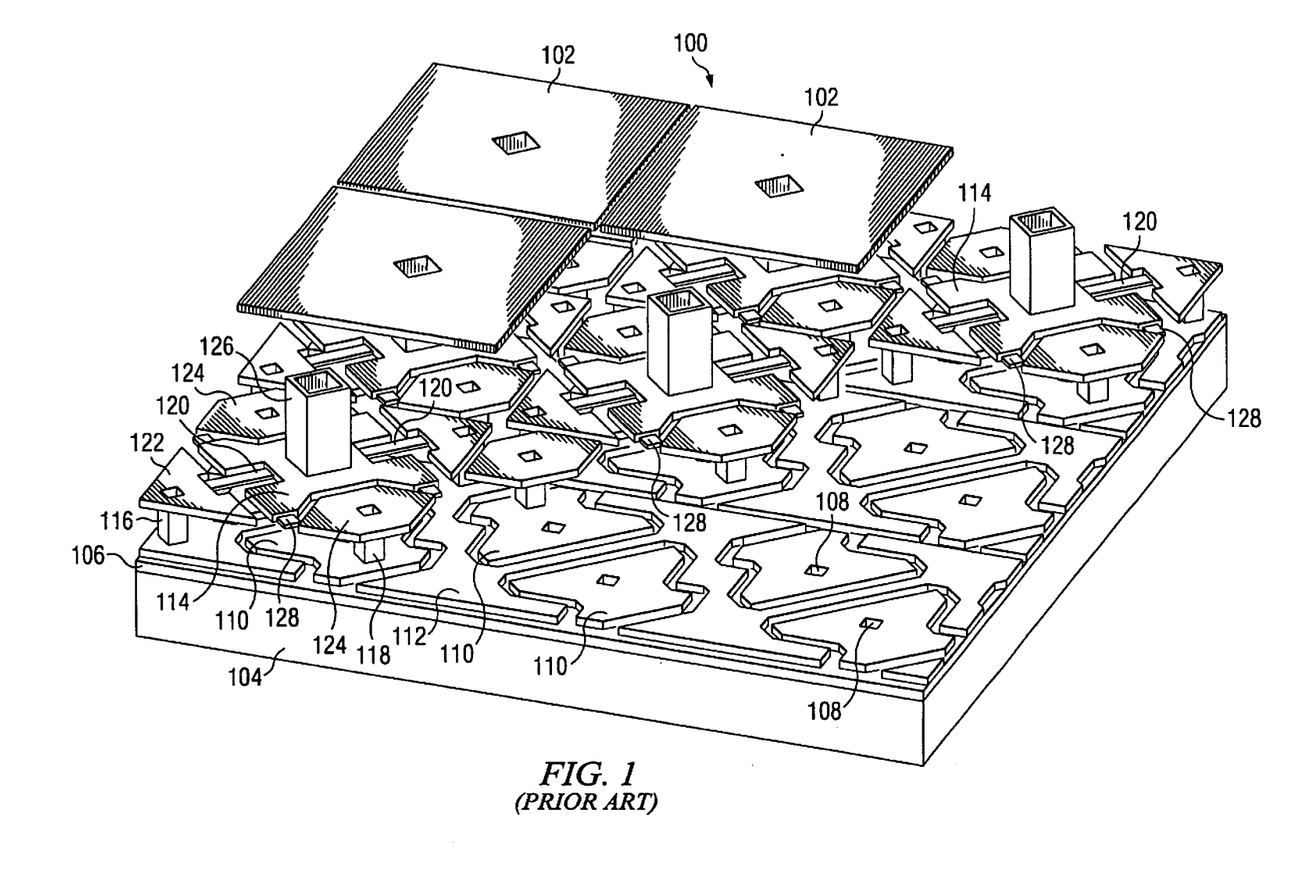
FIG. 1 is a perspective view of a small portion of a micromirror array of the prior art.
Figure 2:
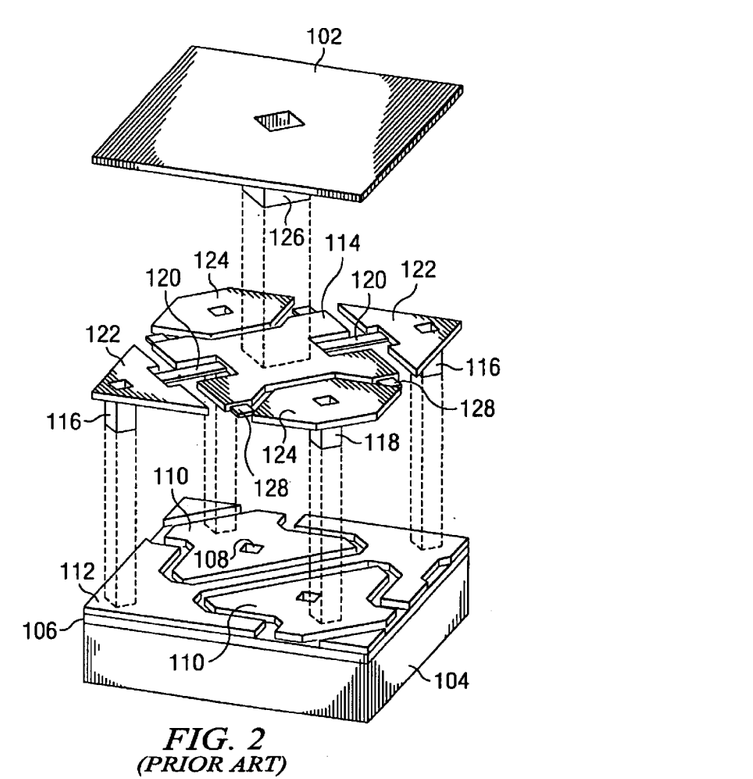
FIG. 2 is an exploded perspective view of a single micromirror element from the micromirror array of FIG. 1.

FIG. 1 shows a typical hidden-hinge DMD 100 of the prior art. The DMD 100 actually is an orthogonal array of DMD cells, or elements. This array often includes more than a thousand DMD rows and columns of DMDs. FIG. 1 shows a small portion of a DMD array of the prior art with several mirrors 102 removed to show the underlying mechanical structure of the DMD array. FIG. 2 is an exploded view of a single DMD element of the prior art further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the DMD substrate, or may be external to the DMD. Image processing and formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell—thus reducing the number of memory cells necessary to operate a very large array, and making more room available for voltage driver and image processing circuitry on the DMD integrated circuit. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes which are separate and distinct structures but are electrically connects to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias/reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 μm thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 μm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque that is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a fixed location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing through three color filters mounted on a rotating color wheel.

When used in an image projection display system, the micromirror provides an exceptional image. One very important characteristic of a high quality image is the contrast ratio, or the ratio between the brightness of the brightest pixel a display can form and the brightness of the darkest pixel a display can form. Micromirror displays have a very high contrast ratio. Using dark field illumination enables the micromirror system to produce extremely dark pixels. The pixels that are turned off, are so much darker than the structures used to define the border of the modulator array, that methods had to be devised to darken the border around the image.

Figure 3:
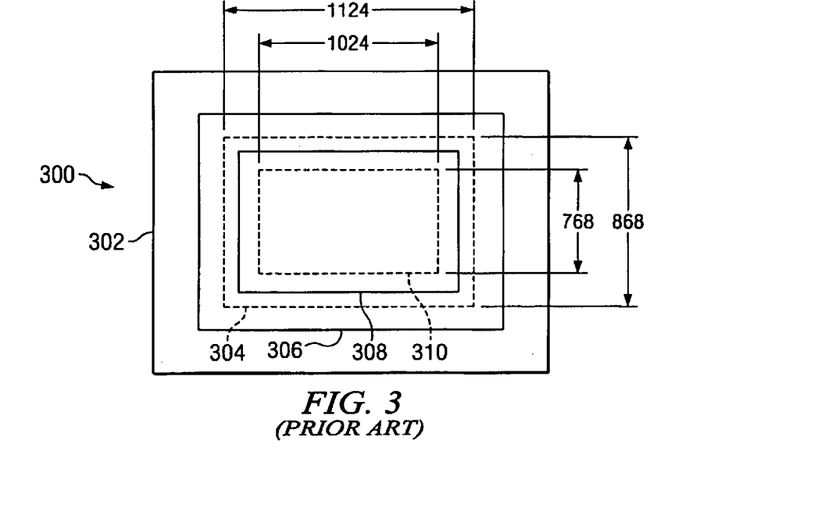
FIG. 3 is a plan view of a portion of a micromirror device showing the package window, array aperture, and the border region known as a sea of mirrors used to give projected images a sharp dark border.

FIG. 3 is a plan view of a micromirror array 300. In FIG. 3, a package substrate 302—typically a ceramic substrate—holds a micromirror array 304. The micromirror array 304 is enclosed by the substrate 302 and a glass window 306 attached to the substrate 302. A metal aperture stop is deposited on the inside of the package lid to create an edge 308 beyond which light is blocked. During operation of the micromirror display system, the metal aperture stop is much brighter than the off mirrors, creating an annoying band light around the perimeter of the array.

To create a sharp dark border around the active portion of the array, a "sea of mirrors" is used. The sea of mirrors comprises an approximately 50 mirror wide border around the active mirrors. The mirrors in the sea of mirrors are always turned to the off position, creating a border at least as dark as the dark pixels in the image. In FIG. 3, this sea of mirrors extends from the edge of the mirror array 304, which is hidden from view by the aperture stop, to a point 310 inside the aperture. If the illumination beam illuminates the aperture at all, there will be a dark band in the image resulting from the aperture, and a darker inner band from the sea of mirrors surrounding the active portion of the array.

The mirrors in the sea of mirrors borders of the prior art have been fabricated exactly like the active mirrors—that is the image forming mirrors in the center of the array—except that since the mirrors in the sea of mirrors need only turn in one direction, they are formed with smaller gaps between the mirrors. The smaller gaps are enabled by the fact that additional clearance is only needed to avoid interference between adjacent mirrors that are turning in opposite directions.

The sea of mirrors is a substantial portion of the total number of mirrors formed in the array. For example, in a 1024×768 array, the sea of mirrors uses 189,200 mirrors compared to the 786,432 mirrors in the active portion of the array. Some designs use a narrower border region, for example 20 mirrors, but forming a sea of mirrors 20 mirrors wide still requires 73,280 mirrors. The more mirrors used in the border region, the more likely it is that at least one of the mirrors will be defective. Because the sea of mirrors is always dark, any defect in the mirrors will result in an extremely noticeable image defect. It is therefore imperative that the sea of mirrors be formed in such a way that the chance of a defective part being formed is minimized, or better still in such a way that any defective pixels form a dark—less noticeable—defect.

Although all of the mechanisms are not well understood, prior art micromirror designs and manufacturing processes lead to a significant number of device failures due to bright defects in the sea of mirrors. What is needed is a pixel design and manufacturing process that prevents bright defect from occurring in the sea of mirrors. The present invention meets this need by providing a pixel design and manufacturing process that yields a bistable pixel with failure modes that create only dark defects.

Unlike prior art designs that use the same basic structure for elements in both the sea of mirrors and the active array, the present invention proposes a novel superstructure for the sea of mirrors. The novel superstructure uses an asymmetric beam to produce electrostatic attraction only towards the "off" state—thus preventing the deflectable member from being attracted to the "on" state where it could become a bright defect. The novel superstructure further alters the landing mechanism on the "on" state to ensure that any pixels that do rotate to the "on" position must rotate so far that the light reflected by the "on" failures misses the projection aperture—preventing the formation of a bright defect.

Figure 4:
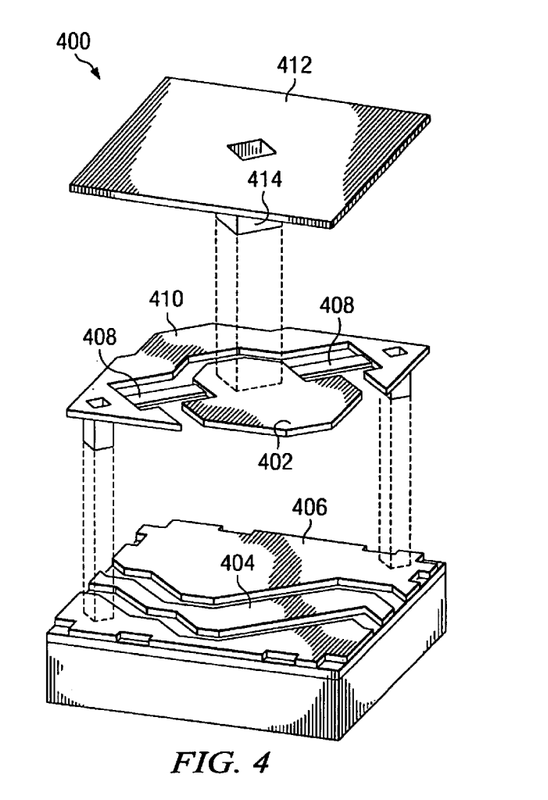
FIG. 4 is an exploded perspective view of a single micromirror pixel element according to one embodiment of the present invention.

FIG. 4 is an exploded perspective view of a single micromirror pixel element 400 according to one embodiment of the present invention. In FIG. 4, the torsion hinge yoke 402 is asymmetric—that is, it primarily extends on one side of the torsion hinge axis. This asymmetry, coupled with the use of an address electrode 404 on the side to which the yoke 402 extends, makes the micromirror element operable only in a single direction. That is, although the mirror may be free to rotate in either direction about the hinge axis, the only mechanism operable to generate an electrostatic force is designed to only operate the micromirror in one direction.

The metal layer used to form the address electrode typically is patterned to form two main features. One feature is the address electrode 404 and the other feature is an electrical shield 406. The shield layer 406 serves a variety of purposes. First, it provides electrical contact from the underlying circuitry to the micromirror superstructure. Second, it provides a landing site on which the yoke 402 or beam can come to rest. When serving the landing site function, it is important that the landing site and the yoke 402 or beam either be held at the same voltage level or else be insulated from each other. Third, the metal layer provides a planar surface on which to build the micromirror superstructure.

The design shown in FIG. 4 provides a simple layout that may be replicated side by side to provide a continuous series of mirrors sharing a common address and mirror voltage. This interconnection scheme greatly simplifies the underlying circuitry since only a single voltage source or memory cell is needed to drive a number of mirrors. The metal layer of FIG. 4 also has a high fill factor providing an almost continuous smooth metal surface on which the micromirror superstructure is formed. The continuous metal surface simplifies the application of planar spacer layers on and in which the various parts are formed.

Figure 5:
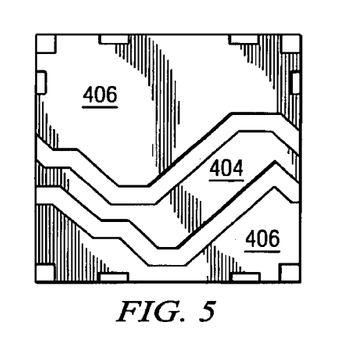
FIG. 5 is a plan view of the M3 metal layer of the pixel element of FIG. 4 showing the shape of a shield member and an address electrode.

The metal layer used to form the address electrodes 404 and shield member 406 traditionally is the third metal layer used in the fabrication of the micromirror and therefore is referred to as the M3 layer. The first two metal layers are used to form interconnections between the circuitry controlling the micromirror array. FIG. 5 is a plan view of the M3 metal layer of the pixel element 400 of FIG. 4 showing the shape of the shield member 406 and the address electrode.

Figure 6:
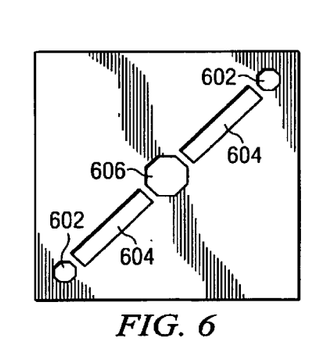
FIG. 6 is a plan view of a the hinge and spacervia masks used to form the pixel element of FIG. 4.

The intermediate layer of the micromirror superstructure is formed from two metal layers. Following the fabrication sequence described above, a photoresist layer is spun on the M3 metal layer, and holes are opened in the photoresist to allow interconnection between the hinge level and the underlying M3 layer. FIG. 6 is a plan view of the micromirror element showing features patterned by three different steps. The photoresist is exposed and developed to define holes 602 shown in FIG. 6.

Figure 7:
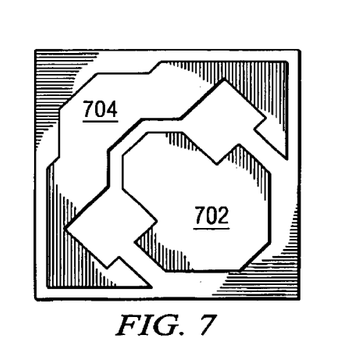
FIG. 7 is a plan view of the beam level metal layer of the pixel element of FIG. 4, forming an asymmetric beam according to one embodiment of the present invention.

After the holes are formed in the first photoresist layer, a thin hinge metal layer is deposited on a planar photoresist and into the holes. An oxide etch mask is then deposited on the thin metal layer and patterned to form the torsion hinge etch stops 604 shown in FIG. 6. A thick metal layer is then deposited over the thin hinge metal layer and the torsion hinge etch stops 604. An etch mask is then formed and patterned on the thick metal layer as shown in FIG. 7. The etch mask has one region defining the beam or hinge yoke 702, and another region defining the torsion hinge caps and a filler region 704 opposite the hinge yoke 702. The filler region 704 levels the device at the beam metal layer making it a lot easier to form a planar photoresist layer over the hinge beam level. The thick and thin metal layers are then etched simultaneously to form the beam or hinge yoke 402, torsion hinges 408, and filler region 410 shown in FIG. 4.

After the beam layer is etched, the second photoresist layer is spun over the beam layer. Another hole or via is opened in the second photoresist layer using the mirror via pattern 606 shown in FIG. 6. A thick metal layer is then deposited over the second photoresist layer and patterned to form the mirror 412. Metal entering the holes in the second photoresist forms the mirror support spacervia 414. The two photoresist spacer layers are then removed to allow the beam and mirror to deflect.

Figure 8:
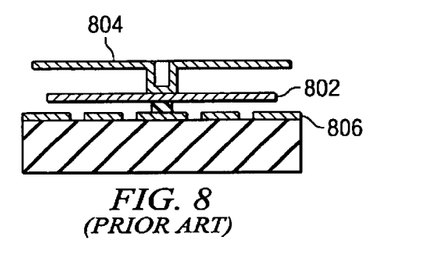
FIG. 8 is a cross section side view of one pixel element of a micromirror of the prior art in an undeflected state.
Figure 9:
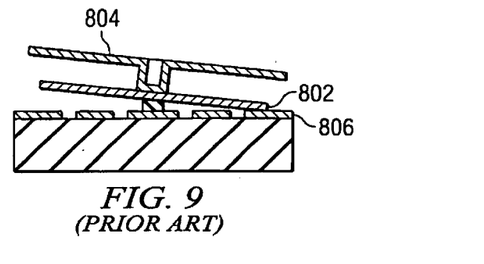
FIG. 9 is a cross section side view of one pixel element of a micromirror of the prior art rotated to the "off" state.
Figure 10:
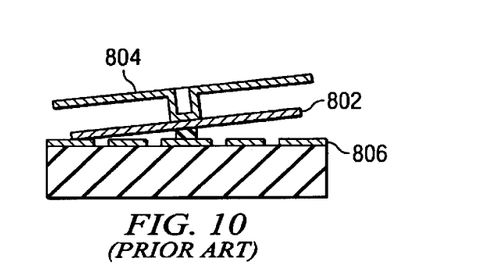
FIG. 10 is a cross section side view of one pixel element of a micromirror of the prior art rotated to the "on" state.

FIGS. 8–10 illustrate the operation of the micromirror. In FIG. 8, the beam 802 and mirror 804 are undeflected. In FIGS. 9 and 10, the mirror and beam are deflected. As seen in FIGS. 9 and 10, the micromirror deflects equally in either direction, stopping when the beam touches the underlying metal layer.

Figure 11:
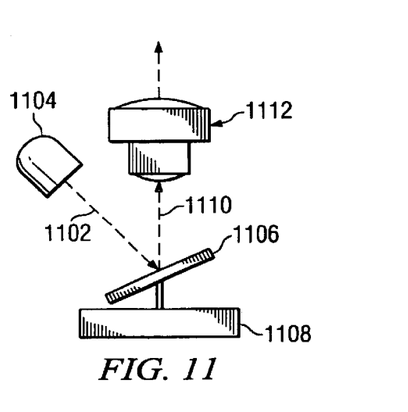
FIG. 11 is a schematic side view illustrating the basics of dark field illumination with a pixel in an "on" position.

FIG. 11 is a schematic side view illustrating dark field illumination of the micromirror as commonly used in projection display systems. In FIG. 11, light 1102 from a light source 1104 is focused on a micromirror 1106 that is tilted toward the light source in an "on" direction. The deflection of the micromirror in FIG. 9 is stopped by contact between the beam 802 and the M3 metal layer 806.

The extent to which the micromirror 1106 deflects before it is stopped depends on the design of the micromirror element, but generally is between 10° and 12°. In projection displays, the light source 1104 commonly is placed at an angle equal to twice the deflection angle of the mirror so that the micromirror 1106 reflects the light along a path perpendicular to the micromirror substrate 1108. The reflected light 1110 enters a projection lens 1112 and is focused onto an image plane (not shown).

Figure 12:
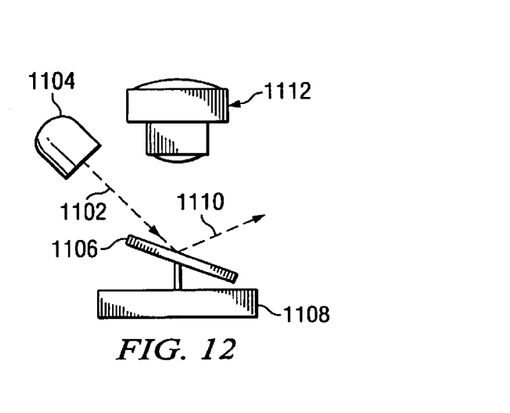
FIG. 12 is a schematic side view illustrating the basics of dark field illumination with a pixel in an "off" position.

In FIG. 12, the same micromirror 1106 is tilted in the opposite, or "off" direction. When the mirror 1106 is tilted in the off direction, the light reflected by the mirror is reflected along a path that does not enter the lens, and the light is not focused on the image plane. Therefore, when the mirror 1106 is tilted toward the light source in the "on" direction, the corresponding point on the screen is illuminated, while when the mirror 1106 is tilted in the "off" direction the corresponding point on the screen is dark.

Figure 13:
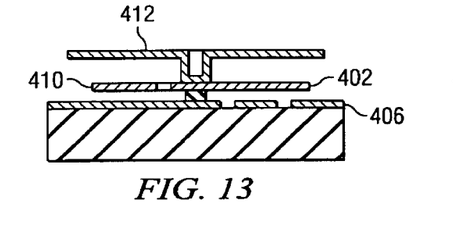
FIG. 13 is a cross section side view of one pixel element of a micromirror according to one embodiment of the present invention in an undeflected state.
Figure 14:
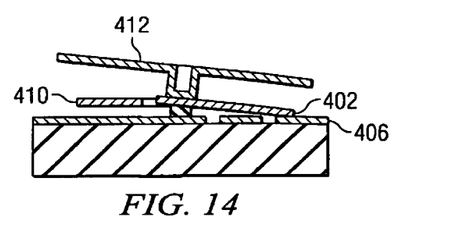
FIG. 14 is a cross section side view of one pixel element of a micromirror according to one embodiment of the present invention rotated to the "off" state.
Figure 15:
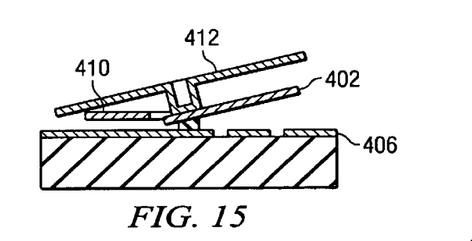
FIG. 15 is a cross section side view of one pixel element of a micromirror according to one embodiment of the present invention rotated to the "on" state.

FIGS. 13–15 show the operation of the novel micromirror design of FIG. 4. In FIG. 13, the mirror 412 and beam 402 are in the undeflected state. In FIG. 14, the mirror 412 and beam 402 are deflected to the "off" state. The mirror 412 rotation is stopped by contact between the beam 402 and the M3 metal layer 406.

In FIG. 15, the mirror 412 is deflected to the "on" position. Since there is very little beam 402 extending to the "on" side of the side of the hinge axis, there is no electrostatic force to attract the mirror to the "on" position, but a it is possible some mechanical shock or manufacturing defect could force the mirror toward the "on" position. Without a beam on the "on" side of the axis, the beam 402 does not contact the M3 metal layer 406 and the beam 402 and mirror 412 are allowed to continue to rotate until the mirror 412 contacts either the filler region 410 of the beam level or the M3 metal layer 406. Alternatively, the mirror 412 and beam 402 may be stopped by the resistance of the torsion hinges. While the M3 metal layer 406 stops the rotation of the beam 402 and mirror 412 at approximately 10° when rotated in the "off" direction, the lack of the beam in the "on" direction allows the mirror 412 to rotate more than 10° in the "on" direction.

Figure 16:
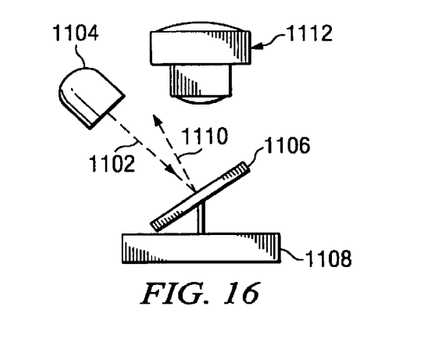
FIG. 16 is a schematic side view illustrating the basics of dark field illumination with a pixel in an over rotated "on" position.

FIG. 16 illustrates the fail-safe nature of this over rotation in the "on" direction. When the mirror 1106 rotates more than half of the angle between the light source 1104 and the projection lens 1112, the reflected light 1110 misses the projection lens 1112 and the corresponding image pixel remains dark. Thus, the micromirror element of FIG. 4 includes two novel features which independently produce the desired result of a dark pixel. First, the asymmetric beam ensures the electrostatic attraction produced by the address electrode can only operate the device in the "off" direction. Second, the lack of a substantial beam member on the "on" side ensures that failed pixels that rotate in the "on" direction over rotate enough to cause light reflected by the over rotated mirror to miss the aperture of the projection lens.

Figure 17:
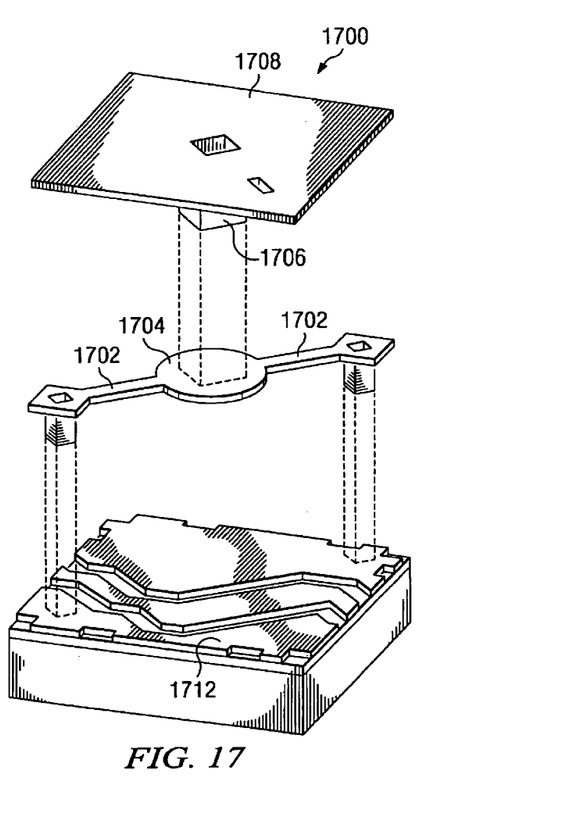
FIG. 17 is an exploded perspective view showing a beamless micromirror pixel element according to one embodiment of the present invention.

Many alternate pixel designs are possible using the various teachings of the present invention. For example, the same principle of unidirectional rotation coupled with over rotation in the opposite direction may be applied to other designs, including beamless designs. FIG. 17 is a micromirror element of a new beamless hidden hinge design. The element of FIG. 17 using only a thin metal hinge layer to form the torsion hinges 1702. In place of a large thick beam, a wide portion 1704 on the hinge layer is provided on which to form the mirror support spacervia 1706 which supports the mirror 1708. One or more spring-tip landing nubs are formed on the underside of the mirror using a smaller spacervia 1710 through the mirror spacer layer. When the mirror deflects, the rotation is stopped by contact between the landing nub and the M3 metal layer 1712.

Figure 18:
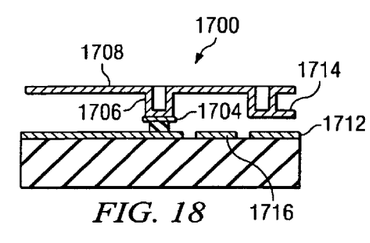
FIG. 18 is a cross section side view of the beamless micromirror pixel element of FIG. 17 in an undeflected state.
Figure 19:
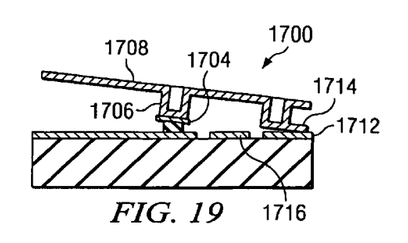
FIG. 19 is a cross section side view of the beamless micromirror pixel element of FIG. 17 rotated to the "off" state.
Figure 20:
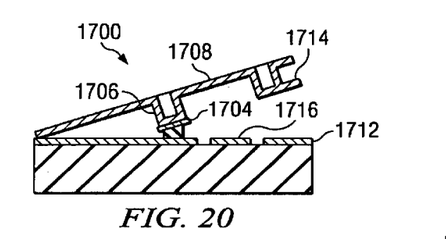
FIG. 20 is a cross section side view of the beamless micromirror pixel element of FIG. 17 rotated to the "on" state.

FIGS. 18–20 show the operation of the beamless micromirror pixel element 1700 of FIG. 17. In FIG. 18, the micromirror 1708 is in the undeflected position. In FIG. 19, an attractive force is established between the micromirror and the only address electrode 1716. The attractive force causes the micromirror to twist about the torsion hinge axis until the deflection is arrested by contact between the spring tip 1714 and the M3 metal layer 1712.

Should the micromirror pixel element 1700 ever be rotated in the opposite direction, the lack of a spring tip will allow the mirror to over rotate. When used in the sea of mirrors, this over rotation prevents reflected light from entering the projection aperture and then reaching the displayed image. The same principles are also applicable to other designs, such as hidden hinge designs that land on the mirror rather than the yoke and spring ring designs.

Figure 21:
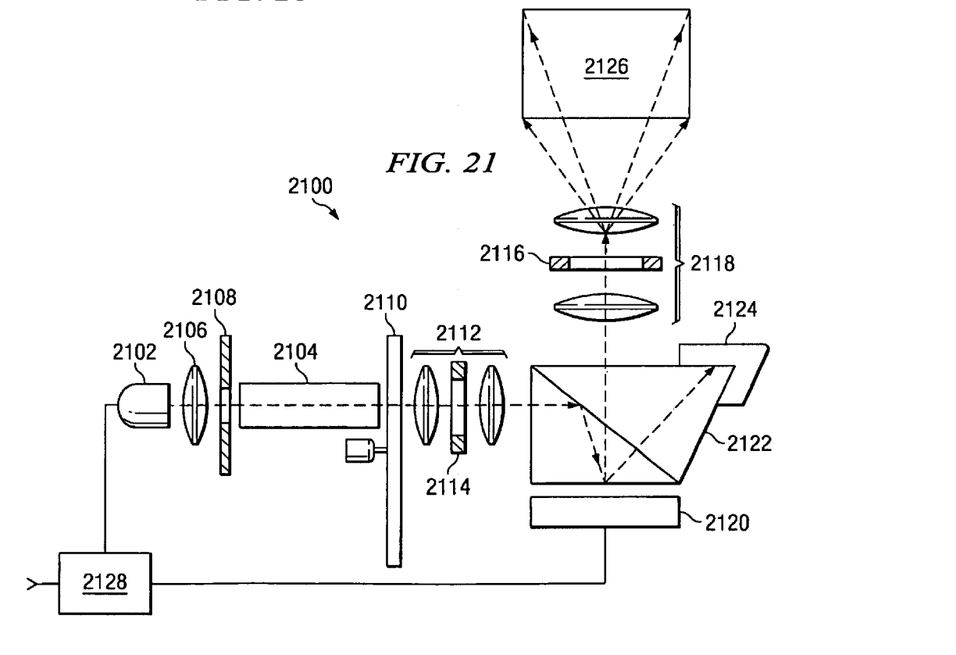
FIG. 21 is a schematic view of a micromirror-based projection system utilizing an improved micromirror device according to one embodiment of the present invention.

FIG. 21 is a schematic view of a micromirror-based projection system 2100 utilizing the one embodiment of the optical components and methods described herein. In FIG. 21, light from light source 2104 is focused on the entrance pupil of an integrating rod 2104 by lens group 2106. The entrance pupil of the integrating rod 2104 is surrounded by a reflective aperture stop 2108. Light striking the reflective aperture stop 2108 is returned to the light source. The integrating rod 2104 homogenizes the light passing through it. Light exiting the integrating rod 2104 passes through a color wheel 2110—which may be a scrolling color wheel or other type of recycling color wheel.

The light passing through the color wheel 2110 is focused by lens group 2112. Aperture stop 2114 typically is located in lens group 2112. Lens group 2112 focuses the illumination light onto a spatial light modulator 2120 through a TIR prism assembly 2122. The off state light and the flat state light are directed to a light dump 2124 which absorbs the light.

On state light exits the TIR prism assembly 2122 and enters the projection lens 2118. Another aperture stop 2116 typically is used in the projection lens 2118 to block a portion of the light, preventing it from passing through the lens to the image plane 2122. Controller 2128 provides image data and control signals to the spatial light modulator 2120 to control the modulation of the illumination light in order to form an image on the image plane 2126. Similar projection methods are used with color splitting prisms and three modulators in high brightness color projectors.

Thus, although there has been disclosed to this point a particular embodiment for *** and method therefore etc., it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A micromirror device comprising:
    a substrate;
    at least one address electrode supported by said substrate;
    a torsion hinge supported apart from said substrate;
    an asymmetric yoke supported by said torsion hinge; and
    a deflectable member supported by and apart from said yoke.

2. The micromirror device of claim 1, said asymmetric yoke limiting deflection of said deflectable member in a first direction of rotation about said torsion hinge and not so limiting said deflection in an opposite direction.

3. The micromirror of claim 1, said at least one address electrode comprising:
    an address electrode supported by said substrate on one side of an axis of said torsion hinge, said address electrode operable to attract said asymmetric yoke only toward said one side of said torsion hinge axis.

4. The micromirror of claim 1, said at least one address electrode comprising:
    an address electrode supported by said substrate on one side of an axis of said torsion hinge, said address electrode operable to attract said asymmetric yoke only toward said one side of said torsion hinge axis.

5. The micromirror of claim 1, said at least one address electrode comprising:
    an address electrode supported by said substrate on one side of an axis of said torsion hinge, said address electrode operable to attract said asymmetric yoke only toward said one side of said torsion hinge axis.

6. A micromirror device comprising:
    a substrate;
    a torsion hinge supported apart from said substrate;
    a yoke supported by said torsion hinge;
    a deflectable member supported by and apart from said yoke; and
    an address electrode supported by said substrate and positioned only on one side of an axis of said torsion hinge, said address electrode operable to attract said yoke toward said one side of said torsion hinge axis.

7. A micromirror device comprising:
    a substrate;
    an array of elements, each said element comprising:
        a torsion hinge supported apart from said substrate;
        a deflectable member supported by and apart from said torsion hinge;
        a means for rotating said deflectable member about said torsion hinge in a first and second direction; and
        a means for limiting said deflection of said deflectable member; and
    said array of elements comprising a first group of elements in which said means for limiting said deflection limits said deflection in said first direction to a greater degree than in said second direction and a second group of elements in which said means for limiting said deflection does not so limit said deflection.

8. The micromirror device of claim 7, said means for limiting said deflection comprising an asymmetric yoke.

9. The micromirror device of claim 7, said means for limiting said deflection comprising a least one landing nub.

10. A display system comprising:
- a light source for providing a beam of light along a light path;
- a micromirror on said light path for selectively modulating said beam of light, said micromirror comprising:
  - a substrate;
  - at least one address electrode supported by said substrate;
  - a torsion hinge supported apart from said substrate;
  - an asymmetric yoke supported by said torsion hinge; and
  - a deflectable member supported by and apart from said yoke; and
- a projection lens for focusing said selectively modulated beam of light.

11. The display system of claim 10, said asymmetric yoke limiting deflection of said deflectable member in a first direction of rotation about said torsion hinge and not so limiting said deflection in an opposite direction.

12. The display system of claim 10, said at least one address electrode comprising:
- an address electrode supported by said substrate on one side of an axis of said torsion hinge, said address electrode operable to attract said asymmetric yoke only toward said one side of said torsion hinge axis.

13. A display system comprising:
- a light source for providing a beam of light along a light path;
- a micromirror on said light path for selectively modulating said beam of light, said micromirror comprising:
  - a substrate;
  - at least one address electrode supported by said substrate;
  - a torsion hinge supported apart from said substrate;
  - a yoke supported by said torsion hinge; and
  - a deflectable member supported by and apart from said yoke, said yoke limiting deflection of said deflectable member in a first direction of rotation about said torsion hinge and not so limiting said deflection in an opposite direction; and
- a projection lens for focusing said selectively modulated beam of light.

14. The display system of claim 13, said at least one address electrode comprising:
- an address electrode supported by said substrate on one side of an axis of said torsion hinge, said address electrode operable to attract said asymmetric yoke only toward said one side of said torsion hinge axis.

15. A display system comprising:
- a light source for providing a beam of light along a light path;
- a micromirror on said light path for selectively modulating said beam of light, said micromirror comprising:
  - a substrate;
  - a torsion hinge supported apart from said substrate;
  - a yoke supported by said torsion hinge;
  - a deflectable member supported by and apart from said yoke; and
  - an address electrode supported by said substrate and positioned only on one side of an axis of said torsion hinge, said address electrode operable to attract said yoke toward said one side of said torsion hinge axis; and
- a projection lens for focusing said selectively modulated beam of light.

16. A display system comprising:
- a light source for providing a beam of light along a light path;
- a micromirror on said light path for selectively modulating said beam of light, said micromirror comprising an array of elements formed on a substrate, each element comprising:
  - a torsion hinge supported apart from said substrate;
  - a deflectable member supported by and apart from said torsion hinge;
  - a means for rotating said deflectable member about said torsion hinge; and
  - a first group of said elements having a means for limiting said deflection of said deflectable member in a first direction to a greater degree than in a second direction while a second group of said elements does not have said means for limiting; and
- a projection lens for focusing said selectively modulated beam of light.

17. The display system of claim 16, said means for limiting said deflection comprising an asymmetric yoke.

18. The display system of claim 16, said means for limiting said deflection comprising a least one landing nub.

* * * * *